United States Patent [19]

Polek

[11] Patent Number: 5,177,150
[45] Date of Patent: Jan. 5, 1993

[54] POWDER COATINGS OF VINYLIDENE FLUORIDE/HEXAFLUOROPYLENE COPOLYMERS

[75] Inventor: Michael D. Polek, Norristown, Pa.

[73] Assignee: Elf Atochem North America, Inc., Philadelphia, Pa.

[21] Appl. No.: 521,792

[22] Filed: May 10, 1990

[51] Int. Cl.$^5$ .............. C08L 33/08; C08L 33/10; C08L 27/20; C08L 27/16
[52] U.S. Cl. ......................... 525/199; 525/221; 525/222; 525/276; 264/146; 524/406; 524/407
[58] Field of Search ............ 525/199, 276, 221, 222; 264/140; 524/406, 407

[56] References Cited

U.S. PATENT DOCUMENTS

| | | | |
|---|---|---|---|
| 4,076,929 | 2/1978 | Dohany . | |
| 4,314,004 | 2/1982 | Stoneberg | 428/421 |
| 4,348,312 | 9/1982 | Tung | 525/199 |
| 4,569,978 | 2/1986 | Barber . | |
| 4,770,939 | 9/1988 | Sietsess et al. | 428/402 |
| 4,824,911 | 4/1989 | Chu | 525/199 |
| 4,851,479 | 7/1990 | Blaise et al. | 525/276 |

FOREIGN PATENT DOCUMENTS

| | | | |
|---|---|---|---|
| 280591 | 1/1988 | European Pat. Off. . | |
| 284996 | 5/1988 | European Pat. Off. . | |
| 63-309551 | 12/1988 | Japan | 525/199 |

OTHER PUBLICATIONS

Tournut et al., "Some Aspects of Thermoplastic Copolymers of Vinylidene Fluoride" (Abstract #21) (1988).

Tournut et al., "Some Aspects of Thermoplastic Copolymers of Vinylidene Fluoride" (Poster).

Dupont Viton, A Capsule View of A, B & E Types of Viton, J. E. Alexander.

*Primary Examiner*—James J. Seidleck
*Assistant Examiner*—W. R. H. Clark
*Attorney, Agent, or Firm*—Seidel, Gonda, Lavorgna & Monaco

[57] ABSTRACT

A pigmented powder coating composition comprises:

(a) a resin component comprising (1) from about 50 wt. % to about 90 wt. % VDF/HFP copolymer resin having a melt viscosity of from about 1 to about 4 kilopoise measured at 100 sec$^{-1}$ and 232° C., and (2) from about 10 wt. % to about 50 wt. % of at least one thermoplastic acrylic resin, and (b) a pigment component comprising from about 5 to about 30 parts of at least one pigment, per 100 parts by weight of the resin component.

The powder coating composition is prepared by pelletizing the mixture components, cryogenically grinding the pellets, and classifying the particles. The composition is applied to a substrate, and subjected to heat treatment to form a coating. The coatings prepared in this manner are characterized by improved flexibility, crack resistance and surface smoothness.

16 Claims, No Drawings

POWDER COATINGS OF VINYLIDENE FLUORIDE/HEXAFLUOROPYLENE COPOLYMERS

FIELD OF THE INVENTION

The invention relates to polyvinylidene fluoride-based powder coatings and a process for preparing the same. More particularly, the invention relates to such powder coatings based upon vinylidene fluoride/hexafluoropropylene copolymers of extremely low melt viscosity, capable of providing smooth, crack resistant finishes.

ABBREVIATIONS

The following materials are referred to in the herein specification by their common abbreviations:

| | |
|---|---|
| DSC | differential scanning calorimetry |
| HFP | hexafluoropropylene |
| IPP | diisopropyl peroxydicarbonate |
| TCFM | trichlorofluoromethane |
| VDF | vinylidene fluoride |
| PVDF | polyvinylidene fluoride |

BACKGROUND OF THE INVENTION

Typical thermoplastic fluoropolymer powder coatings are characterized by degrees of mechanical performance and surface roughness or "orange peel" associated with the finish. "Orange peel" may be reduced through various approaches. While the resin melt viscosity may be reduced in order to combat orange peel, melt viscosity reduction generally has an adverse effect on the mechanical properties of the coating, particularly impact resistance, flexibility, and crack resistance.

Powder coatings of PVDF and copolymers thereof containing at least 90 wt. % VDF are disclosed in U.S. Pat. No. 4,770,939. The PVDF-based resin disclosed in the aforesaid patent for powder coatings has a melt viscosity according to ASTM D3835 of 6 to 7 kilopoise at 230° C. A minor amount of a low molecular weight acrylic polymer is required as a flow improving agent.

European Patent Application 284,996 discloses a powder coating composition of a polymeric binder and greater than 40 wt. % of a coalescing additive component containing at least one coalescing agent which is solid at ambient temperature to promote flow and fusion of the binder into a substantially coalesced film with the application of heat. The coalescing additive is substantially volatilized from the film during coalescence. The release of such latent solvents is undesirable.

What is needed is a fluoropolymer powder coating characterized by a very low viscosity such that the inclusion of flow-improving agents is unnecessary. There is a need for a coating composition which is smooth and yet retains desirable mechanical properties of impact and crack resistance.

SUMMARY OF THE INVENTION

A powder coating composition is provided comprising:
a resin component comprising from about 50 wt. % to about 90 wt. % VDF/HFP copolymer resin having a melt viscosity of from about 1 to about 4 kilopoise measured at 100 sec$^{-1}$ and 232° C., and from about 10 wt. % to about 50 wt. % of at least one thermoplastic acrylic resin, and
a pigment component comprising from about 5 to about 30 parts of at least one pigment, per 100 parts by weight of the resin component.

Preferably the resin component comprises from about 70 wt. % to about 90 wt. % VDF/HFP copolymer resin and from about 10 wt. % to about 30 wt. % thermoplastic acrylic resin, most preferably from about 70 wt. % to about 80 wt. % VDF/HFP copolymer resin and from about 20 wt. % to about 30 wt. % thermoplastic acrylic resin. Preferably the pigment component comprises from about 10 to about 15 parts by weight of pigment, per 100 parts by weight of the resin component.

DETAILED DESCRIPTION OF THE INVENTION

The extremely low viscosity VDF/HFP copolymer resins utilized in the present powder coating composition may be prepared by emulsion polymerization of VDF and HFP monomers according to the commonly assigned U.S. Pat. No. 5,093,427 entitled "Copolymers Of Vinylidene Fluoride And Hexafluoropropylene And Process For Preparing The Same" of Leonard A. Barber, filed on even date herewith. The entire disclosure of the aforementioned commonly assigned patent application is incorporated herein by reference.

According to conventional methods for copolymer preparation by emulsion polymerization, all of the HFP monomer is combined with VDF monomer in an initial reaction mixture charge, or is introduced continuously in a fixed feed ratio with VDF. The result is a uniformly random VDF/HFP copolymer. The VDF/HFP copolymers utilized in the practice of the present invention are produced according to the aforementioned U.S. patent application by homopolymerizing VDF monomer, followed by further VDF polymerization with HFP, resulting in a polymer having discrete VDF homopolymer domains and a discrete VDF/HFP copolymer domain. Such polymers possess improved properties over the uniformly random VDF/HFP copolymers. Specifically, they display greater melt flow, lower flexural modulus, improved impact resistance, and/or improved chemical resistance. These benefits are obtained without sacrifice to the use temperature of the polymer. In particular, the VDF/HFP copolymers of the aforementioned U.S. patent application provide very low melt viscosity resins which display excellent flow characteristics under minimal shear stress, while nevertheless maintaining the integrity of favorable mechanical properties.

While conventional VDF/HFP copolymer display melt temperatures below about 150° C., generally 140°–145° C., the copolymers utilized herein are characterized by a melting point, as determined by DSC, in the range of about 160 to about 170° C., more particularly from about 163° C. to about 168° C., which closely approaches the melting point of VDF homopolymer (168°–170° C.).

The VDF/HFP copolymers utilized in the practice of the present invention preferably have an HFP content, as roughly determined by the ratio of HFP to total monomer present in the emulsion polymerization process, of from about 1% to about 20%, preferably from about 5% to about 15%, by weight, and a melt viscosity of from about 1 to about 4 kilopoise measured at 100 sec$^{-1}$ and 232° C. (ASTM D3835).

A suitable low viscosity VDF/HFP copolymer for use in the practice of the present invention is prepared from Example 1 of the aforementioned U.S. patent application "Copolymers Of Vinylidene Fluoride And Hexafluoropropylene, etc.", substantially as follows:

Into an 80-gallon stainless steel autoclave was charge 454 pounds of deionized water, 100 grams of ammonium perfluorodecanoate and 12 grams of paraffin wax. The reactor was closed, evacuated, and heated to 90° C. with agitation. Twenty pounds VDF monomer and 6.5 pounds TCFM were pumped into the reactor to obtain the desired operating pressure. Upon stabilization of the temperature and operating pressure, 1 pound of IPP in the form of an emulsion consisting of 1 wt. % IPP in deionized water containing 0.15 wt. % ammonium perfluorodecanoate was added to begin the polymerization. The rate of addition of the IPP emulsion was adjusted to obtain and maintain a VDF polymerization rate of 60 pounds per hour. The VDF homopolymerization reaction was continued until approximately 135 pounds (representing 75 wt. % of the total VDF monomer utilized in the herein example) was introduced into the reaction mass. Thereafter, 20 pounds of HFP (comprising 10 wt. % of the total of combined VDF and HFP monomers utilized in the herein example) was pumped into the reactor at a rate of approximately 100 pounds per hour, while the VDF feed is continued. The sudden influx of the relatively slow reacting HFP monomer temporarily suppressed the reaction rate. The initiator addition rate was increased to restore the reaction rate back to 60 pounds per hour. The reaction continued until a total of 180 pounds of VDF had been added to the reaction mass.

The batch was allowed to react-out at a constant temperature of 90° C. to consume residual monomers at decreasing pressure. After about 30 minutes, the agitation was stopped and the reactor was vented, and the latex recovered. Polymer resin was isolated by coagulating the latex, washing with deionized water, and drying.

The resulting resin contained approximately 8 wt. % HFP (by measurement) and displayed a melt viscosity of 1.4 kilopoise, measured at 232° C and 100 sec$^{-1}$ (ASTM D3835), and a DSC melting point of 163°-168° C.

The melt viscosity of the VDF/HFP copolymer may be conveniently increased or decreased by decreasing or increasing the amount of chain transfer agent (e.g., TCFM) utilized in the polymerization process. Generally, the amount of chain transfer agent is increased to prepare polymers of lower melt viscosity and narrow molecular weight distribution.

The thermoplastic acrylic resins useful in the practice of the present invention serve to stabilize the coating. Suitable thermoplastic acrylic resins as coating stabilizers include, for example, any of the thermoplastic polymers or copolymers of acrylic acid, methacrylic acid, or esters of these acids. The esters are formed by the reaction of acrylic or methacrylic acid with suitable alcohols, for example, methyl alcohol, ethyl alcohol, propyl alcohol, butyl alcohol and 2-ethyl hexyl alcohol. Preferred thermoplastic acrylic polymers are homopolymers and copolymers of methyl methacrylate and higher alkyl methacrylate polymers. Particularly preferred are copolymers of methyl methacrylate and ethyl acrylate, such as ACRYLOID B44 (Rohm and Haas Co., Philadelphia, Pa.).

Copolymers of methyl methacrylate may be formed from the polymerization of methyl methacrylate with a comonomer which makes up a minor proportion of the copolymer. Such copolymers of methyl methacrylate include, for example, the copolymers identified in U.S. Pat. No. 3,253,060, namely, polymers obtained by polymerizing methyl methacrylate with a minor proportion of comonomers such as ethyl methacrylate, propyl methacrylate, butyl methacrylate, ethyl acrylate, propyl acrylate, butyl acrylate, styrene, α-methylstyrene, and methacrylic acid.

The thermoplastic acrylic resin component is responsible for certain highly desirable coating characteristics such as those characteristics recognized in U.S. Pat. No. 3,340,222: less discoloration after a baking cycle which gives best adhesion and coalescence of the coating; less discoloration after exposure to high temperature use conditions; improved post-forming durability of the coating (i.e., resistance to damage by bending, pounding, abrading, etc.) after a baking cycle which gives the best adhesion and coalescence of the coating; and improved color, gloss and coating durability after prolonged exposure to weather. Improvement in discoloration resistance upon baking results from stabilization of the pigment component. Titanium dioxide, in particular, benefits from the stabilizing effect of the thermoplastic acrylic resin component.

The composition contains one or more pigments. The same pigments useful in other PVDF based coatings may satisfactorily be used in the practice of the present invention. The pigments include, for example, those pigments identified in U.S. Pat. No. 3,340,222. The pigment may be organic or inorganic. According to one embodiment, the pigment component may comprise titanium dioxide, or titanium dioxide in combination with one or more other inorganic pigments wherein titanium dioxide comprises the major part of the combination. Inorganic pigments which may be used alone or in combination with titanium dioxide include, for example, silica; iron oxides of various colors; lead titanate; and various silicates, for example, talc, diatomaceous earth asbestos, mica, clay and basic lead silicate. Pigments which may be used in combination with titanium dioxide include, for example, zinc oxide, zinc sulfide, zirconium oxide, white lead, carbon black, lead chromate, leafing and non-leafing metallic pigments, molybdate orange, calcium carbonate and barium sulfate.

The preferred pigment category is the ceramic metal oxide type pigments which are calcined. Chromium oxides and some iron oxides of the calcined type may also be satisfactorily utilized. For applications where a white coating is desired, a non-chalking non-yellowing rutile-type of titanium is recommended. Cadmium, lithopones and the like are inadequate as they suffer from lack of chalk resistance and/or inadequate hiding. Anatase TiO$_2$ is similarly not recommended.

The pigment component is advantageously present in the composition in the amount of from about 5 to about 30 parts by weight, per 100 parts of resin component. While for most applications the preferred range is from about 10 to about 15 parts by weight pigment per 100 parts of resin component, for white and light colored pigment the amount of pigment is generally higher than the preferred amount, and may be as high as 30 parts by weight per 100 parts of resin component.

The extremely low melt viscosity, melt flow and excellent mechanical properties of the VDF/HFP resin provide, upon compounding with a suitable thermoplastic acrylic resin, a binder for pigmented powder coatings characterized by significantly increased resistance to cracking and pealing. Unlike the prior art compositions of U.S. Pat. No. 4,770,939, no additional flow-promoting agents need be utilized.

The powder coating composition is prepared by the steps of: mixing the VDF/HFP copolymer resin, thermoplastic acrylic resin and pigment; pelletizing the mixture to form pellets; and cryogenically grinding the pellets to form a particulate powder.

The mixture of VDF/HFP copolymer resin, thermoplastic acrylic resin and pigment is melt-mixed by extrusion, such as in a twin-screw extruder operating in the range of from about 390° F. to about 420° F. The extruded mixture is thereafter pelletized by conventional techniques. While the dimensions of the pellets are not critical, it is preferred that the pellets have a size as small as reasonably possible to facilitate handling.

In the next step, the pellets are cryogenically ground into a powder according to conventional techniques. Techniques for cryogenic grinding are known to those skilled in the art. For example, the temperature of the pellets may be suitably lowered for grinding by immersion in liquid nitrogen. The grinding equipment may consist of, for example, a hammer mill with a 0.010 slotted screen. Liquid nitrogen may be fed into the hammer mill during the grinding operation. The resulting raw powder is classified to the desired particle size by passage through the appropriately sized sieve. While the particle size generally depends upon the application, the composition is advantageously ground to particles sized from about 1 to about 70$\mu$. The particles of 0-10$\mu$ in diameter are generally discarded for health reasons, and because particles of this small size tend to block transport hoses and other equipment.

For a target coating thickness of 2.0 mils, the powder is ground and classified to an average particle diameter in the range of about 35-45$\mu$. For films of less thickness, the particle size is reduced below this range. For films thicker than 2.0 mils, the average particle size is increased above the 35-45$\mu$ range.

The resulting powder may be applied to a substrate according to any means suitable for obtaining an even distribution of powder. Electrostatic application is the preferred method of application. The powder coating of the invention may be applied over the substrate with or without a primer coating. Following application, the powder coating is subjected to a treatment sufficient to melt the powder coating. The temperature used should be higher than the melting point of the powder, which may be readily determined. Preferably, the coating is heated to a temperature of from about 460° F. to about 500° F. The coating and its substrate are thereafter cooled by any suitable means.

The practice of the invention is illustrated by the following non-limiting examples.

EXAMPLE 1

60 9 wt. % of VDF/HFP copolymer having a melt viscosity of 1.4 kilopoise at 232° C. and 100 sec$^{-1}$ (ASTM D3835) was added to 26.1 wt. % of a poly(methylmethacrylate) resin comprising a 70:30 methyl methacrylate and ethyl acrylate copolymer of approximately 88,000 molecular weight (ACRYLOID B44, Rohm and Haas Co., Philadelphia, Pa.). Also added to the mixture was 13.0 wt. % of a pigment comprising a mixture of 70 wt. % TiO$_2$ and 30 wt. % Cr$_2$O$_3$. The mixture of copolymer resin, acrylic resin and pigment was blended in a high intensity mixer for about 5 minutes to form a homogeneous blended batch. The batch was melt-compounded in a twin-screw extruder operating in the range of 390° F. to 420° F., and pelletized. The pellets were soaked in liquid nitrogen and cryogenically ground in a hammer mill equipped with a 0.010 slotted screen. Liquid nitrogen was fed into the hammer mill during the grinding operation. The powder was collected after grinding and classified to a specific particle size distribution by passing the powder through a vibratory screen assembly with sieve openings of 75 microns. Powder under 75 microns diameter was collected as useful material. The powder was thereafter electrostatically applied at 70 KV to a substrate in the form of an alodine-pretreated aluminum panel. The panel was baked for 10 minutes at 490° F. to sufficiently fuse the powder. The final film coating thickness ranged from about 2.0 to about 2.5 mils. No peeling or cracking was observed upon 50 inch-pounds crosshatch impact (reverse or direct), or 60 inch-pounds impact (direct or reverse). Upon annealing the panel at 60° for 24 hours and bending to 180° C., no cracks were observed in the coating under 10× magnification.

EXAMPLE 2

The procedure of Example 1 was repeated except that the melt viscosity of the VDF/HFP copolymer utilized in forming the powder coating composition was 2.2 kilopoise (232° C. and 100 sec$^{-1}$, ASTM D3835), and the TiO$_2$/Cr$_2$O$_3$ pigment was replaced by a 60/20/20 wt. % mixture of a first pigment comprising a combination of oxides of iron, aluminum and titanium (Brown #19), a second pigment comprising a combination of oxides of iron, chromium, zinc and titanium (Brown #10), and a third pigment comprising a combination of oxides of copper and chromium (Black #1B), all from Shepherd Color Company, Cincinnati, Ohio. The VDF/HFP copolymer had a melt flow index of 19 g/10 min. (ASTM D1238, with a 1.2 kg weight). No cracks were observed in the coating upon testing as in Example 1.

Example 1 was repeated substituting for the VDF/HFP copolymer resin various PVDF homopolymer resins of melt viscosities ranging from 3.5 to 9.2 kilopoise (232° C.; 100 sec$^{-1}$ (ASTM D3835)), with varying amounts and types of pigment. The data is summarized in Table 1. The "DISLON PC-620" flow additive combined with KYNAR ® 710 is a mixture of a hexane-soluble fraction consisting of polyethylacrylate and poly(2-ethylhexylacrylate) in approximately equimolar amounts, and a hexane-insoluble fraction consisting of low molecular weight polyethylene and a secondary amide component. All pigments, except TiO$_2$, were obtained from Sheperd Color Company. It may be readily appreciated that substitution of the identical amount of low-viscosity VDF/HFP copolymer for PVDF homopolymer resulted in a powder coating composition capable of yielding a coating with significantly increased crack resistance.

TABLE 1

| Example | Fluoropolymer Resin | Fluoropolymer Melt Viscosity(8) | Acrylic Resin | Fluoropolymer Resin/Acrylic Resin wt. Ratio | Parts of Pigment per 100 weight parts of Combined Resins | Crack (1) Test |
|---|---|---|---|---|---|---|
| 1 | VDF/HFP | 1.4 | PMMA (2) | 70/30 | 15 | No Cracks |
| 2 | VDF/HFP | 2.2 | PMMA | 70/30 | 15 | No Cracks |
| — | PVDF (3) | 3.5 | PMMA | 70/30 | 12 (9) | Cracked |
| — | PVDF (4) | 6.8 | PMMA | 70/30 | 12 (10) | Cracked |
| — | PVDF (5) | 9.2 | PMMA | 70/30 | 12 (11) | Cracked |
| — | PVDF (6) | 6.8 | PMMA | 70/30 | 13 (12) | Cracked |
| — | PVDF (7) | 6.8 | PMMA | 70/30 | 12 (13) | Cracked |

(1) Crack Test - Annealed coated aluminum panel 24 hours at 60° C., followed by 180° bending, and examination for cracks under 10× magnification.
(2) ACRYLOID B44 (Rohm and Haas Co.) - 70:30 copolymer of methyl methacrylate and ethyl acrylate.
(3) KYNAR ® 705 (Atochem North America, Inc.)
(4) KYNAR ® 711
(5) KYNAR ® 720
(6) KYNAR ® 710 with 0.5 wt. % of DISLON PC-620 flow additive
(7) KYNAR ® 711
(8) Kilopoise (100 sec$^{-1}$, 232° C., ASTM D3835).
(9) Green #223 - mixture of oxides of nickel, cobalt, zinc and titanium
(10) Brown #19
(11) Brown #10
(12) 69:25:6 weight mixture of TiO$_2$: Blue #12 - mixture of oxides of cobalt, chromium and aluminum Blue #13 - mixture of oxides of cobalt, chromium and aluminum
(13) Gray #6 - composition unknown The present invention may be embodied in other specific forms without departing from the spirit or essential attributes thereof and, accordingly, reference should be made to the appended claims, rather than to the foregoing specification, as indicating the scope of the invention.

I claim:

1. A powder coating composition comprising:
 a resin component comprising from about 50 wt. % to about 90 wt. % vinylidene fluoride/hexafluoropropylene copolymer resin having a melting point in the range of from about 160° C. to about 170° C. and a melt viscosity of from about 1 to about 4 kilopoise measured at 100 sec$^{-1}$ and 232° C., and from about 10 wt. % to about 50 wt. % of at least one thermoplastic acrylic resin, and
 a pigment component comprising from about 5 to about 30 parts of at least one pigment, per 100 parts by weight of resin component.

2. A powder coating composition according to claim 1 wherein the resin component comprises from about 70 wt. % to about 90 wt. % vinylidene fluoride/hexafluoropropylene copolymer resin and from about 10 wt. % to about 30 wt. % thermoplastic acrylic resin.

3. A powder coating composition according to claim 1 wherein the resin component comprises from about 70 wt. % to about 80 wt. % vinylidene fluoride/hexafluoropropylene copolymer resin and from about 20 wt. % to about 30 wt. % thermoplastic acrylic resin.

4. A powder coating composition according to claim 1 comprising from about 10 to about 15 parts by weight pigment component per 100 parts by weight resin component.

5. A powder coating composition according to claim 2 comprising from about 10 to about 15 parts by weight pigment component per 100 parts by weight resin component.

6. A powder coating composition according to claim 3 comprising from about 10 to about 15 parts by weight pigment component per 100 parts by weight resin component.

7. A powder coating composition according to claim 1 wherein the vinylidene fluoride/hexafluoropropylene copolymer resin has a hexafluoropropylene content of from about 1 to about 20 wt. % of the copolymer.

8. A powder coating composition according to claim 7 wherein the vinylidene fluoride/hexafluoropropylene copolymer resin has a hexafluoropropylene content of from about 5 to about 15 wt. %.

9. A powder coating composition according to claim 1 wherein the vinylidene fluoride/hexafluoropropylene copolymer resin has a melting point in the range of from about 160° C. to about 168° C.

10. A composition according to claim 1 wherein the thermoplastic acrylic resin comprises a homopolymer or copolymer of poly(methyl methacrylate).

11. A composition according to claim 2 wherein the thermoplastic acrylic resin comprises a homopolymer or copolymer of poly(methyl methacrylate).

12. A composition according to claim 3 wherein the thermoplastic acrylic resin comprises a homopolymer or copolymer of poly(methyl methacrylate).

13. A powder coating composition according to any of claims 10, 11 or 12 wherein the poly(methyl methacrylate) resin, comprises a copolymer of methyl methacrylate and ethyl acrylate.

14. A powder coating composition according to claim 1 prepared by the steps of mixing the resin and pigment components, pelletizing the mixture, and cryogenically grinding the pellets to form a particulate powder.

15. A powder coating composition according to claim 14 wherein the step of mixing the resin and pigment components comprises mixing and extruding the components at a temperature of from about 390° F. to about 420° F.

16. A powder coating composition according to claim 15 containing particles having a diameter of less than about 75 microns.

* * * * *